(12) United States Patent
Haussmann et al.

(10) Patent No.: US 11,309,601 B2
(45) Date of Patent: Apr. 19, 2022

(54) BATTERY SYSTEM

(71) Applicant: Webasto SE, Stockdorf (DE)

(72) Inventors: Jochen Haussmann, Stockdorf (DE); Michael Schoenberger, Stockdorf (DE); Yamara Rios-Leon, Stockdorf (DE); Philipp Brucker, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 340 days.

(21) Appl. No.: 16/226,402

(22) Filed: Dec. 19, 2018

(65) Prior Publication Data

US 2019/0190097 A1  Jun. 20, 2019

(30) Foreign Application Priority Data

Dec. 19, 2017  (DE) .................. 10 2017 130 558.0

(51) Int. Cl.
| | |
|---|---|
| *H01M 10/658* | (2014.01) |
| *H01M 50/20* | (2021.01) |
| *H01M 50/24* | (2021.01) |
| *H01M 50/116* | (2021.01) |
| *H01M 50/124* | (2021.01) |

(52) U.S. Cl.
CPC ........ *H01M 10/658* (2015.04); *H01M 50/116* (2021.01); *H01M 50/124* (2021.01); *H01M 50/1245* (2021.01); *H01M 50/20* (2021.01); *H01M 50/24* (2021.01); *H01M 2220/20* (2013.01)

(58) Field of Classification Search
CPC ........... H01M 10/658; H01M 2220/20; H01M 2/0277; H01M 2/0292; H01M 2/1077; H01M 2/1094; H01M 50/116; H01M 50/124; H01M 50/1245; H01M 50/20; H01M 50/24; Y02E 60/10
See application file for complete search history.

(56) References Cited

U.S. PATENT DOCUMENTS

2014/0162093 A1  6/2014 Reitzle et al.

FOREIGN PATENT DOCUMENTS

| | | | |
|---|---|---|---|
| DE | 10 2016 202 024 | 8/2017 | |
| DE | 102016202024 A1 * | 8/2017 | ............ H01M 50/24 |
| DE | 10 2017 125 130 | 5/2018 | |
| WO | WO 2015/113858 | 8/2015 | |
| WO | WO-2015113858 A2 * | 8/2015 | ........ H01M 10/6554 |

OTHER PUBLICATIONS

Machine Translation of DE-102016202024-A1, Czok Andreas. (Year: 2017).*

Office Action from German Patent Application No. DE 10 2017 130 558.0, dated Oct. 30, 2018 (8 pages).

* cited by examiner

*Primary Examiner* — Mayla Gonzalez Ramos
(74) *Attorney, Agent, or Firm* — Haynes and Boone, LLP

(57) ABSTRACT

A battery system for holding battery cells in order to form a motor vehicle battery, includes a housing, system components for fastening and contacting the battery cells in the housing, and a foam body held in the housing for displacing air volume. The foam body has a recess for receiving a system component.

20 Claims, 2 Drawing Sheets

BATTERY SYSTEM

CROSS REFERENCE TO RELATED APPLICATION

This application claims priority from German Patent Application No. DE 10 2017 130 558.0, filed on Dec. 19, 2017 in the German Patent and Trademark Office, the disclosure of which is incorporated herein by reference in its entirety.

BACKGROUND

Technical Field

The present invention relates to a battery system for a motor vehicle, such as a traction battery system for a motor vehicle.

Related Art

Battery systems for motor vehicles are known in which battery cells are contained inside a housing. The battery cells are mechanically interconnected across system components formed as fastening components, electrically contacted with each other across system components formed as contacting components, and regulated or controlled with regard to their power output or power consumption. Furthermore, the battery cells may be controlled in their temperature by means of system components formed as temperature control components.

The housing in which the battery cells are held, contacted, and controlled in their temperature, usually has a larger volume than is occupied by the battery cells and the system components themselves. In this regard, it is known to fill up free volumes in which no battery cells or system components of the battery system are present at least partly by means of a foam body, so as in this way to reduce the free air volume inside the housing.

In this way, it is possible to reduce the free air volume of the battery housing which needs to be exchanged with the surroundings for a pressure equalization in the case of fluctuating ambient pressure and fluctuating temperatures.

Furthermore, by reducing the free air volume inside the battery housing it is possible to reduce the atmospheric oxygen that is present inside the battery housing and to be able in this way to lessen the danger of a fire inside the housing.

A battery system in which foam bodies are present inside the housing is known for example from DE 10 2016 202 024 A1.

SUMMARY

A battery system is described with a housing for holding battery cells in order to form a motor vehicle battery, including system components for fastening and contacting the battery cells in the housing, as well as a foam body held in the housing for displacing the air volume. The foam body has a recess for receiving a system component.

Because a recess is provided in the foam body, in which a system component can be received, a simplified construction of the battery system can be achieved.

System components can accordingly be easily received in this way in the recess in the foam body and separate fastening devices for holding the system components inside the housing can be reduced or can be eliminated entirely.

This also allows a simplified assembly of the battery system, because the system component does not need to be secured with separate fastening means, but instead can just be received in the mounting.

By the use of the foam body with a recess which is complementary to the system component being received, it is likewise possible to reduce the free air volume in the housing that needs to be exchanged with the surroundings through appropriate exchange valves during temperature fluctuations and/or air pressure fluctuations in order to avoid a build-up of excess pressure or a vacuum in the housing.

By receiving the system component in the recess of the foam body, it is also possible to further reduce the free air volume in the housing, since the system component is at least partially surrounded by the foam body and the foam body does not simply lie against the system component.

In this way, it is also possible for any dehumidification devices in the housing, which ensure that humidity is removed from the air entering the housing to such an extent that a defined atmosphere is provided inside the housing and in particular a condensation of air humidity is avoided, to likewise have a smaller dimension.

Furthermore, less atmospheric oxygen is present inside the housing and accordingly less atmospheric oxygen leads in the event of an accident for a possible igniting inside the housing. Hence, the safety of the battery system can be improved.

In one embodiment, the foam body includes a fire-extinguishing material. The material is in this case generally not only self-extinguishing, but rather serves to extinguish a fire possibly occurring inside the housing in that the oxygen in the housing is removed and/or a smothering layer or liquid is produced by the heat from the material, which smothers or extinguishes the fire.

In several embodiments, the fire-extinguishing material shields the other battery cells and system components inside the housing from the fire source, for example in that the material melts or becomes liquefied to the extent that a protective film or a protective layer is placed over the remaining, still intact battery cells.

Accordingly, the fire-extinguishing function of the material of the foam body is to be distinguished from merely fire retardant or fire-extinguishing materials which however do not in themselves provide any active extinguishing function. It should be kept in mind here that the battery system with its housing is typically used in a motor vehicle as a self-contained system, so that the battery system in the event of a fire at a battery cell can typically be entirely extinguished by itself to then be replaced as a unit, while the integrity of the other components of the motor vehicle is not further impaired.

The material used for the foam body can be, for example, an EPP (expanded polypropylene) material, which is generally halogen-free as per IEC 61249-2-21. For example, the material ARPRO4135 FR can be used here.

In certain embodiments, the recesses in the foam body are formed complementarily to the system components at least in sections, so that the respective individual system components can be received in them with a precise fit. Especially in some embodiments, the system components are introduced into the foam body under a certain prestressing, so that a rattle-free holding of the system components in the foam body is assured. The recess is accordingly marginally too small for the system component, so that the latter must be pressed into the foam body and accordingly held with a force fit.

In this way, no other fastening means are needed, which results in a quick installation and a low-cost, lightweight structure. In several embodiments, one corresponding foam body that can receive a plurality of system components can be formed in a battery system.

In another embodiment, the foam body is connected to a portion of the housing for vibration dampening. In particular, the foam body may be integrally bonded to a portion of the housing.

In this way, any vibrations of portions of the housing possibly occurring can be dampened or their vibration characteristics can be influenced in order to achieve an acoustically desired result.

For this, the foam body may for example stand in elastic contact with housing portions, so that a direct contact is provided between the foam body and the respective housing portion. Thanks to the elastic and dampening properties of the foam body, an influencing of the vibrating behavior of the respective housing portion can be achieved in this way.

Especially in certain embodiments, the foam body stands in contact with a cover portion of the housing of the battery system such that the vibrating behavior of the cover portion can be influenced. In this way, for example, it is also possible to design the cover portion of the housing of the battery system with a lesser material thickness, since vibrations during the driving operation that are introduced into the cover portion and which might result in unwanted noise production can be dampened by means of the foam body.

In order to achieve a desired vibrating behavior of a housing portion, the foam body may be formed such that it makes contact with the housing portion only in selected sections or at a point. In this way, accordingly, a placing of the mass at certain vibrational nodes of the housing portion can be achieved, so that in this way a shifting of resonance frequencies from a troublesome region to an unproblematic region can be achieved.

In several embodiments, the foam body has a modular construction and in a first foam body module there is provided a first recess for receiving a first system component of a first spatial extension and in a second foam body module there is provided a recess for receiving a second system component with a second spatial extension.

In this way, different system components can be held accordingly in the foam body modules, wherein the foam body modules can then be assembled to form a complete foam body, which is then installed in the interior of the housing such that both the system components can be held in an organized and securely supported way and an individual adaptation to the individual system components provided in the respective battery system can be performed.

Due to the modular construction, a special foam body does not need to be designed for each battery system, but rather a pool of predetermined foam body modules can be used, from which an individual choice can then be made.

In certain embodiments, a first foam body module having a first mass and/or first dampening properties and/or first elastic properties and a second foam body module having a second mass and/or second dampening properties and/or second elastic properties are provided, and a connection of the first foam body module and/or of the second foam body module to the housing and/or a system component is provided for vibration influencing of the housing and/or the system component. Especially in various embodiments, the connection is integrally bonded.

In this way, the vibrating behavior of the housing or of the respective portion of the housing being in contact with the foam body or the foam body modules can also be influenced by means of the different properties of the foam body modules.

It may be desired here to shift the vibrating behavior and the natural resonance of the housing portion from a region in which the excitation frequencies within a motor vehicle are usually situated or from a vibration region which can either be heard or felt by a user of the motor vehicle to another vibration region not perceived as disturbing by the user of the motor vehicle. A shifting of the vibrating behavior of the housing portion can also be organized such that a shifting occurs into a vibration region which is desirable in terms of an acoustic design of the motor vehicle.

The foam body or sections of the foam body and/or of the foam body modules can be connected by integral bonding to housing portions in order to achieve in this way a defined mass damping of the respective housing portion. In this way, at least from acoustic access, the material thickness of the housing portion can be reduced, since the vibration properties are no longer determined solely through the mass damping of the respective housing portion, but also through the additional mass damping by means of the foam body or the portion of the foam body and through the mechanical/elastic properties of the foam body.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in order to avoid redundancy.

Figure 1:
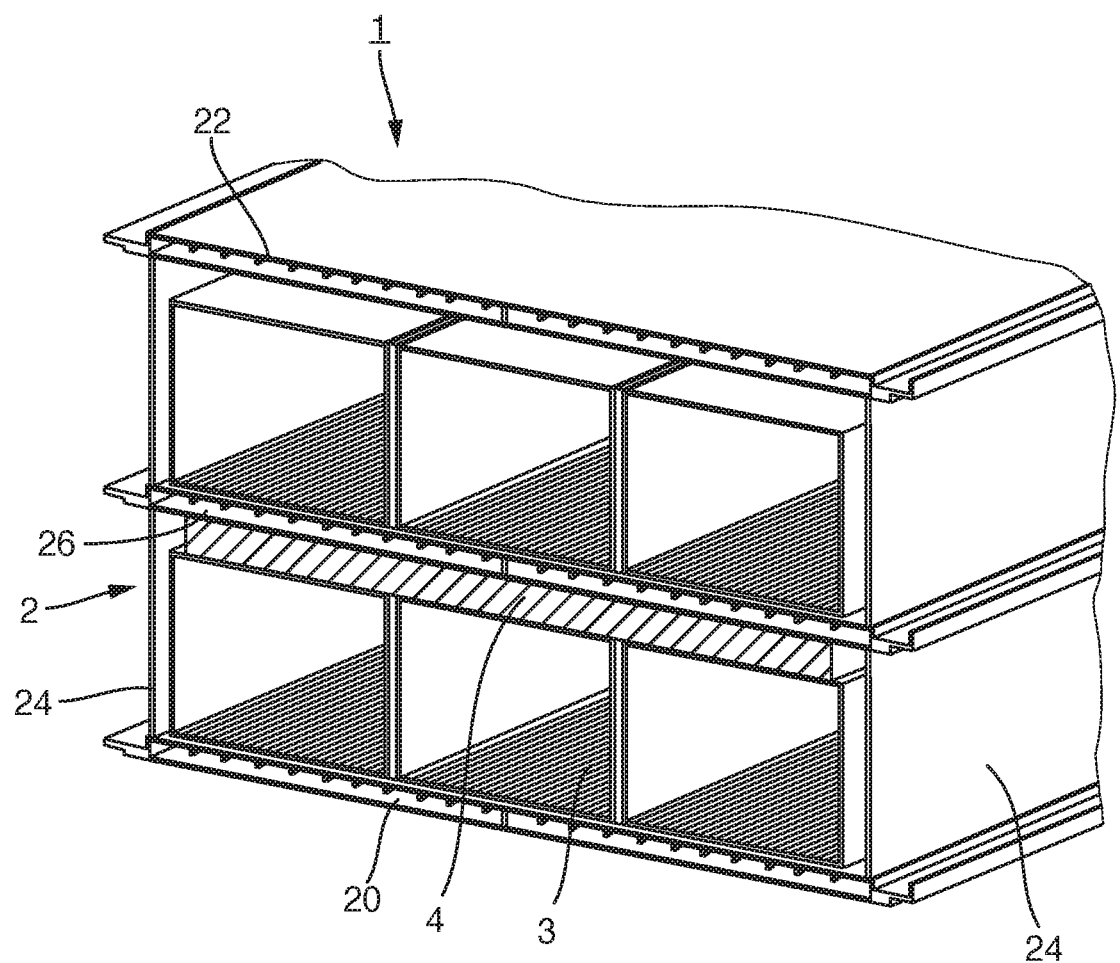
FIG. 1 is a schematic perspective representation of a battery system with a housing, in which battery cells can be held.

FIG. 1 shows schematically in a partially sectioned perspective representation a battery system 1, having a schematically indicated housing 2, in the interior of which likewise schematically are provided battery modules 3 shown.

The battery modules 3 may hold battery cells, not shown in the figures. The battery cells ultimately serve for storing the electric energy within the battery system 1, so as to then provide it in the motor vehicle.

The housing 2 serves for mounting the battery cells in a handy form in the motor vehicle, for shielding the battery cells against external influences, for making possible a temperature control of the battery cells, and for providing a secure holder for the battery cells. In this way, the housing 2 at the same time also affords protection of the surroundings against accidents occurring inside the housing 2, such as for example fires, short circuits, or the leakage of battery fluid. The housing 2 of the battery system 1 is therefore usually hermetically sealed in order accordingly to avoid the escape of harmful media from the housing 2.

Inside the housing 2 in the exemplary embodiment shown there are provided in each case two layers of battery modules 3, each having three battery modules 3 arranged in a row. However, other structures are also conceivable for the arrangement of the battery modules 3.

The housing 2 has a bottom 20, a cover 22 and side portions 24 and is designed in two layers in the exemplary embodiment shown, so that an intermediate bottom 26 is also included. In principle, however, two identical layers are formed here, one above the other, and there may also be further layers in order to adapt the form factor of the housing 2 to the respective requirements in the motor vehicle.

The portions of the housing 2 and especially the bottom 20, the cover 22, the side portions 24 and the intermediate bottom 26 are made from a metallic material, for example from aluminum or an aluminum alloy, and form the physical outer boundary of the battery system 1. The housing 2 is accordingly incorporated in this form in a motor vehicle.

In order to be able to compensate for temperature fluctuations and air pressure fluctuations, the housing 2 hermetically sealed in itself usually has gas exchange means, not shown here explicitly, such as in the form of a gas exchange valve, via which a defined air exchange between the interior of the housing 2 and the surroundings may occur, so that an excess pressure or a partial vacuum in the housing can be equalized against the surroundings. The air volume exchanged through these gas exchange means is dependent on the free air volume present in the housing 2.

In order to keep this free air volume held in the housing 2 as small as possible, foam bodies 4 are provided in the housing 2, which are provided for displacing the air volume held in the housing 2. The foam bodies 4 accordingly fill up regions of the housing 2 which are not filled up by other system components, housing portions or battery cells.

Depending on the configuration of the foam bodies 4, the free air volume present in the housing 2 may be significantly reduced in this way, so that accordingly the exchange of air volume between the interior of the housing 2 and the surroundings can be reduced. Hence, both the gas exchange means can be smaller in dimension and the need for dehumidification of ambient air entering the housing 2 from the surroundings can be reduced.

Figure 2:
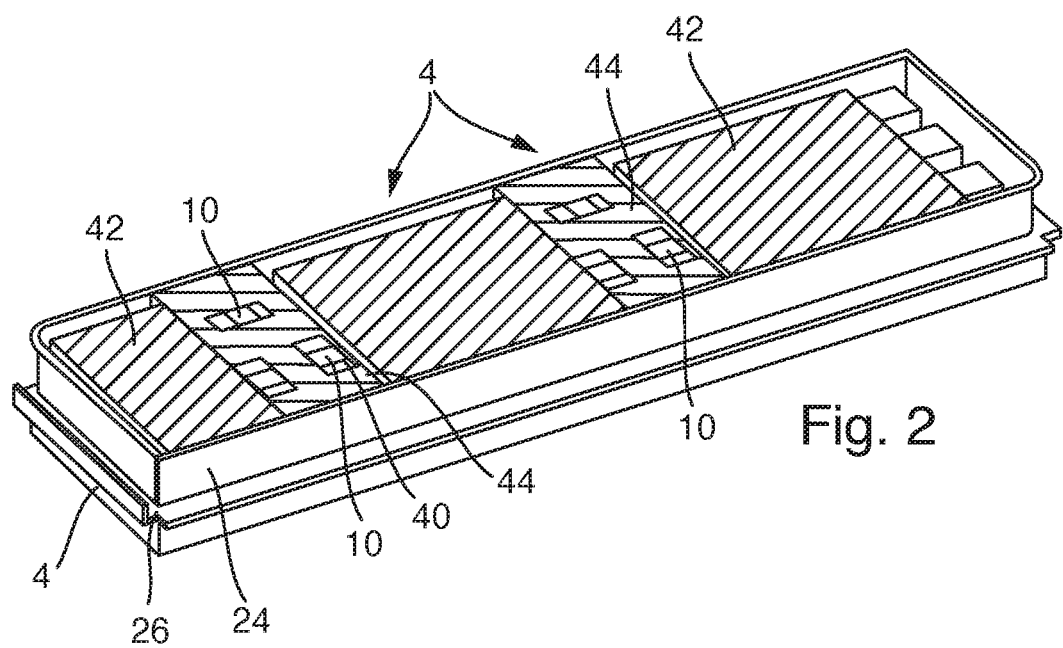
FIG. 2 is a schematic perspective representation of a cutout from the battery system.

The foam body 4 in the exemplary embodiment shown in FIGS. 1 and 2 is designed to be arranged on top of the battery modules 3.

Figure 3:
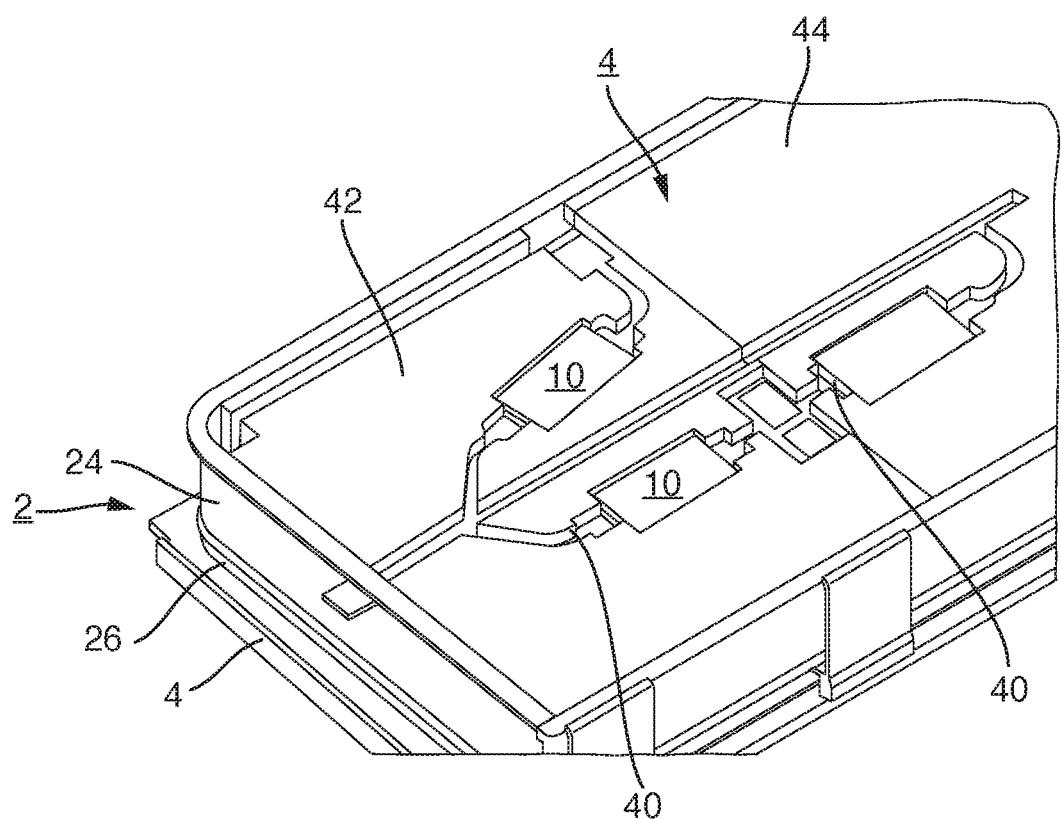
FIG. 3 is a schematic perspective representation of a battery system with a foam body.
Figure 4:
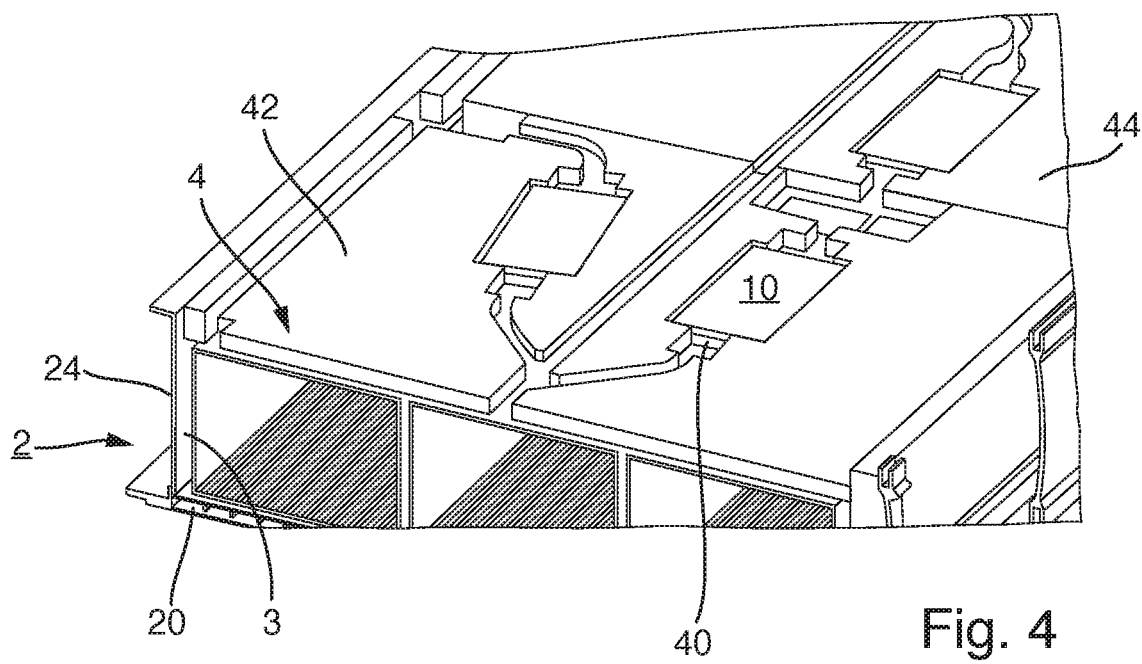
FIG. 4 is a schematic, partially sectioned representation of a housing portion of a battery system.

In this region, as is shown for example in FIGS. 3 and 4, further system components 10 are provided, which may be present in the housing 2 for example in the form of cables, electrical or electronic components, sensors, etc.

The system components 10 are inserted in recesses 40 which are provided in the foam body 4. Hence, the system components 10 can be both received in the foam body 4 and also held in the foam body 4, given a corresponding configuration of the recesses 40.

The recesses 40 are generally configured such that they follow at least in one portion the contours of the respective system components 10, but are somewhat smaller in dimensions so that the recesses 40 in the foam body 4 lie appropriately tightly against the system components 10 and hence provide a secure and tight seat for the system components 10 inside the recesses 40.

In this way, no separate fastening means are needed for fastening the system components 10 and the fastening of the system components 10 occurs solely via the recesses 40 in the foam body 4.

The foam body 4 typically includes a fire-retardant material. Especially in some embodiments, the foam body 4 includes a fire-extinguishing material, which accordingly makes possible an active extinguishing of a fire possibly occurring inside the housing 2 of the battery system 1.

The foam body 4 is furthermore typically of modular form, in order to be able to implement various requirements for the foam body 4 in and efficient manner.

For example, it can be seen in FIG. 2 that a first foam body module 42 is made from a first material and a second foam body module 44 is made from a second material, so that accordingly a modular construction of the overall foam body 4 can be achieved by fitting together the different foam body modules 42, 44.

The first and second foam body modules 42, 44 may also have differently configured recesses 40, so that different system components 10 can be received accordingly in individual foam body modules 42, 44 and in this way a simple construction of the foam body 4 can be achieved by an appropriate construction from different foam body modules 42, 44, depending on the construction of the battery system 1 and the use of system components 10.

The foam body 4 is furthermore configured such that it stands in direct contact with components or portions of the housing 2, as shown for example in FIG. 1. In FIG. 1, the foam body 4 stands in direct contact with the intermediate bottom 26 of the housing 2. In this way, the foam body 4 can act in a vibration dampening way or it can influence the vibration characteristics of the portion of the housing 2 connected to it.

The influencing of the vibration characteristics or the dampening of vibration can be achieved in that the respective portion of the housing 2 is applied to the mass of the foam body 4 so as to influence the vibrating behavior of the portion of the housing 2 in this way.

The application of the mass can take place here, depending on the configuration of the foam body 4, either at one point or over a section or else over the entire surface. The foam body 4 is generally connected to the respective portion of the housing 2 being dampened or influenced, for example, through an integrally bonded connection by gluing.

A mass loading of the respective portion of the housing 2 via the foam body 4 can also be adapted in portions, especially with a modular design of the foam body 4. For example, the mass of a first foam body module 42 forming the foam body 4 may be heavier in a middle portion of the portion of the housing 2 than in its marginal regions, where the portion of the housing 2 is connected to a second foam body module 44.

In this way, given an optimized overall weight of the battery system 1, a mass loading of one portion of the housing 2 can nevertheless be achieved, such that accordingly the vibrating behavior of the portion of the housing 2 and thus of the entire housing 2 is adapted such that a desired acoustic behavior results or is at least approached.

The foam body 4 may furthermore also be pressed against the portion of the housing 2 and thereby exert an elastic prestressing on the housing 2. Thus, a dampening of the vibrations of the housing 2 can likewise be achieved by the elastic prestressing and the dampening properties of the foam body 4.

The vibrating behavior of the respective portion of the housing 2, such as an intermediate bottom 26 or a cover 22 of the housing 2, may thus be varied by a mass loading by means of the foam body 4 over the entire surface, over a section or at one point. Furthermore, the vibrating behavior can be influenced by utilizing the dampening behavior of the foam body 4.

In this way, the respective portion of the housing 2, such as the intermediate bottom 26, the cover 22, the bottom 20 and/or a side portion 24 of the housing 2 can have a lightweight construction—for example by using less material thicknesses of portions or sections of the housing 2, while the vibrating behavior as a whole is not worsened, or is even while improved.

To the extent applicable, all features described in the individual example embodiments can be combined with each other and/or exchanged, without departing from the field of the invention.

What is claimed is:

1. A battery system for holding battery cells to form a motor vehicle battery, comprising:
   a housing;
   a plurality of system components configured to fasten and contact the battery cells in the housing; and
   a foam body held in the housing configured to displace air volume, wherein:
      the foam body comprises a recess configured to receive a system component from the plurality of system components,
      the foam body is connected to a portion of the housing and is configured to dampen vibration,
      the foam body contacts the portion of the housing only in selected sections that enable resonance frequencies to be shifted,
      the recess is part of a first foam body module,
      the foam body further comprises a second foam body module comprising a second recess configured to receive a second system component from the plurality of system components,
      the first foam body module is arranged in a middle portion of the portion of the housing,
      the second foam body module is arranged in marginal regions of the portion of the housing, and
      a mass of the first foam body module is heavier than a mass of the second foam body module.

2. The battery system of claim 1, wherein the foam body further comprises a fire-retardant material.

3. The battery system of claim 2, wherein the fire-retardant material comprises an expanded polypropylene material.

4. The battery system of claim 1, wherein the recess has a shape that is complementary to a shape of the system component that enables the system component to be received in the recess.

5. The battery system of claim 1, wherein the portion of the housing comprises a cover portion of the housing.

6. The battery system of claim 1, wherein the foam body is integrally bonded to the portion of the housing.

7. The battery system of claim 1, wherein the first foam body module has a first mass, first dampening properties, and/or first elastic properties, the second foam body module has a second mass different from the first mass, second dampening properties different from the first dampening properties, and/or second elastic properties different from the first elastic properties, and the first foam body module and the second foam body module are connected to the housing to influence vibration.

8. The battery system of claim 1, wherein the first foam body module has a first mass, first dampening properties, and/or first elastic properties, the second foam body module has a second mass different from the first mass, second dampening properties different from the first dampening properties, and/or second elastic properties different from the first elastic properties, and the first foam body module and the second foam body module are connected to the plurality of system components to influence vibration.

9. The battery system of claim 1, wherein the foam body directly contacts the housing and/or the system component to influence vibration of the housing and/or the system component.

10. The battery system of claim 1, wherein the housing comprises a metallic material.

11. The battery system of claim 10, wherein the metallic material comprises aluminum.

12. The battery system of claim 1, wherein the plurality of system components comprises cables, electronic components, or sensors.

13. A battery system for holding battery cells to form a motor vehicle battery, comprising:
    a metallic housing;
    a plurality of system components configured to fasten and contact the battery cells in the metallic housing; and
    a foam body held in the metallic housing configured to displace air volume, wherein:
       the foam body comprises a recess configured to receive a system component from the plurality of system components and the foam body comprises a fire-retardant material,
       the foam body is connected to a portion of the metallic housing and is configured to dampen vibration,
       the foam body contacts the portion of the metallic housing only in selected sections that enable resonance frequencies to be shifted,
       the recess is part of a first foam body module,
       the foam body further comprises a second foam body module comprising a second recess configured to receive a second system component from the plurality of system components,
       the first foam body module is arranged in a middle portion of the portion of the metallic housing,
       the second foam body module is arranged in marginal regions of the portion of the metallic housing, and
       a mass of the first foam body module is heavier than a mass of the second foam body module.

14. The battery system of claim 13, wherein the fire-retardant material comprises an expanded polypropylene material.

15. The battery system of claim 13, wherein the recess has a shape that is complementary to a shape of the system component that enables the system component to be received in the recess.

16. The battery system of claim 13, wherein the foam body directly contacts the metallic housing and/or the system component to influence vibration of the housing and/or the system component.

17. The battery system of claim 13, wherein the foam body is integrally bonded to the portion of the metallic housing by gluing.

18. A battery system for holding battery cells to form a motor vehicle battery, comprising:
    a housing;
    a plurality of system components configured to fasten and contact the battery cells in the housing; and
    a foam body held in the housing configured to displace air volume, wherein:
       the foam body comprises a recess configured to receive a system component from the plurality of system components, the foam body is connected to a portion of the housing and is configured to dampen vibration, the foam body contacts the portion of the housing only in selected sections that enable resonance frequencies to be shifted, the recess is part of a first foam body module, the foam body further comprises a second foam body module comprising a second recess configured to receive a second system component from the plurality of system components, the first foam body module is arranged in a middle portion of the portion of the housing, the second foam body module is arranged in marginal regions of the portion of the housing, the first foam body module has a first mass, first dampening properties, and first elastic properties, the second foam body module has a second mass different from the first mass, second dampening properties different from the first dampening properties, and second elastic properties different from the first elastic properties, and the first mass of the first foam body module is heavier than the second mass of the second foam body module.

19. The battery system of claim 18, wherein the foam body further comprises a fire-retardant material.

20. The battery system of claim 19, wherein the fire-retardant material comprises an expanded polypropylene material.

\* \* \* \* \*